United States Patent [19]

Lazarus et al.

[11] 4,171,422

[45] Oct. 16, 1979

[54] PRODUCTION OF THERMALLY STABILIZED POLYESTER

[75] Inventors: Stanley D. Lazarus, Petersburg; Kalidas Chakravarti, Richmond; Hugh H. Rowan, Chester, all of Va.; James G. Neal, Raleigh, N.C.

[73] Assignee: Allied Chemical Corporation, Morris Township, Morris County, N.J.

[21] Appl. No.: 941,448

[22] Filed: Sep. 11, 1978

[51] Int. Cl.$^2$ .................... C08G 63/64; C08G 63/68; C08G 63/76
[52] U.S. Cl. ................ 528/437; 260/45.7 PH; 528/274; 525/434
[58] Field of Search ............... 260/45.7, 860; 528/273, 528/274, 177

[56] References Cited

U.S. PATENT DOCUMENTS

| | | | |
|---|---|---|---|
| 2,863,854 | 12/1958 | Wilson | 528/273 |
| 3,268,482 | 8/1966 | Piirma et al. | 528/274 |
| 3,657,191 | 4/1972 | Titzmann | 528/273 |
| 3,888,817 | 6/1975 | Georgoudis | 260/45.7 PH |
| 3,985,705 | 10/1976 | Georgoudis | 260/45.8 A |
| 3,987,004 | 10/1976 | Georgoudis | 260/45.8 A |
| 3,998,908 | 12/1976 | Buxbaum | 260/860 |
| 4,005,057 | 1/1977 | Singh et al. | 526/2 |
| 4,038,258 | 7/1977 | Singh et al. | 528/273 |
| 4,123,420 | 10/1978 | Kyo et al. | 528/127 |
| 4,126,592 | 11/1978 | Borman et al. | 260/22 M |

FOREIGN PATENT DOCUMENTS 48-41713 12/1973 Japan ..................... 528/273

*Primary Examiner*—Lucille M. Phynes
*Attorney, Agent, or Firm*—Fred L. Kelly; Richard A. Anderson

[57] ABSTRACT

High molecular weight linear condensation polyesters are stabilized against deterioration by heat by reacting the polyester in molten form with certain polycarbonates in the presence of a catalytic amount of a phosphonium compound selected from the group consisting of tetra-n-alkylphosphonium acetates and tetra-n-alkylphosphonium halides. For the purpose of this disclosure, polycarbonates are defined as linear polyesters of carbonic acid in which the carbonate groups recur in the polymer chain. In continuous production of the improved polyesters, it is preferred that the polycarbonate and catalyst be added to the process stream with mixing at a point to give 2 to 15 minutes reaction time under superatmospheric pressure before the polyester enters the last polycondensation reactor.

10 Claims, No Drawings

PRODUCTION OF THERMALLY STABILIZED POLYESTER

CROSS-REFERENCES TO RELATED APPLICATIONS

This application is related to our U.S. application Ser. No. 900,356 filed Apr. 26, 1978.

BACKGROUND OF THE INVENTION

1. Field of the Invention

This invention relates to a heat stable fiber forming polyester and to a new and novel process for preparing it. More particularly, this invention relates to an improved linear high molecular weight heat stable polyester especially suitable for preparing fibers which have excellent resistance to degradation when utilized in commercial articles, such as tires, industrial belting, etc., wherein a high degree of heat is built up during use.

2. Description of the Prior Art

High molecular weight polyethylene terephthalate fiber forming polyesters are well known. They are prepared commercially either by the ester interchange reaction between dimethyl terephthalate and ethylene glycol or by the direct esterification process wherein terephthalic acid is reacted directly with ethylene glycol. These products and processes are well documented in U.S. patents such as U.S. Pat. Nos. 2,465,310; 3,050,533; 3,051,212; 3,427,287 and 3,484,410 which cover not only the basic products and processes but many improvements thereon.

Polyethylene terephthalate fibers and cords are known to exhibit excellent dimensional stability, that is, low extension or growth during service, as well as to have a high resistance to thermal degradation; however, in pneumatic tires and industrial belts under high speed conditions under heavy load, loss of tensile strength is experienced due to high temperature reactions occurring under such conditions. In efforts to remedy this problem, most research in this field has been directed to producing a high molecular weight linear polyester having a low content of free carboxyl groups. The following patents are pertinent.

U.S. Pat. No. 3,051,212 to William W. Daniels relates to reinforced rubber articles and to textile cords and fibers for reinforcing such articles. This patent discloses that a linear terephthalate polyester having a concentration of free carboxyl groups of less than 15 equivalents per million grams may be prepared in a number of different ways. One effective procedure is to treat the filaments, after they have been formed, with a chemical reagent which reacts with and "caps" the free carboxyl groups. One such agent is diazomethane.

U.S. Pat. No. 3,627,867 to Eckhard C. A. Schwarz discloses a process and apparatus for melt spinning high molecular weight polyethylene terephthalate into high-performance fibers under conditions which reduce the normally high viscosity of such polyester. Ethylene oxide or other low-boiling oxirane compound is injected under pressure into molten polyester before it is fed to the metering pump of the melt-spinning machine. The fibers are characterized by low free-carboxyl content and freedom from voids which might be expected from injection of the volatile material.

U.S. Pat. No. 3,657,191 to Rudolph Titzmann et al. is directed to a process for the manufacture of linear polyesters having an improved stability with respect to compounds with active hydrogen. Polyesters of this type are obtained by reacting polyesters with ethylene carbonates or monofunctional glycidyl ethers.

U.S. Pat. No. 3,563,847 to Grover W. Rye et al. relates to a rubber structure reinforced with a polyester reinforcing fiber modified with a polycarbonate derived from a 4,4'-dihydroxy-di(mono nuclear aryl)alkane. The polycarbonate is added to the polyester prior to fiber formation.

The closest prior art is believed to be Japanese Pat. No. 41,713 (1973) to Shima et al. on production of polyesters with low carboxy end group contents. This patent discloses reacting a polyester comprising mainly ethylene terephthalate having an intrinsic viscosity greater than 0.4 with ethylene carbonate in the presence of an organic phosphorus catalyst such as triphenylphosphine, trioctylphosphine and trimethylbenzylphosphonium benzoate. However, we have found that relatively few phosphines or phosphonium compounds are suitable as catalysts, particularly if reaction time is limited as in a continuous polyester process. As demonstrated hereinafter, the structure of the compound is very critical respecting the degree of catalytic activity. Also, in a continuous process, the timing of the reaction is very critical.

Although the above-identified patents directed to stabilized polyesters are of major interest, certain of the proposed polyester modifiers are known to be highly toxic and/or hazardous to use on commercial scale. Moreover, we have found that the others are relatively less effective in reducing the carboxyl end group concentration of the polyesters. Accordingly, we have carried out considerable research in this field to solve the long-standing problem of producing a high molecular weight polyester stabilized against deterioration under high temperature operating conditions.

SUMMARY OF THE INVENTION

The present invention relates to an improved high molecular weight heat stable polyester and to a novel process for preparing it. The invention further provides polyester fibers which have excellent resistance to thermal degradation when utilized in commercial articles, such as tires, industrial belting, etc., wherein a high degree of heat is built up during use.

The process of the present invention provides a high molecular weight linear polyester stabilized against thermal degradation comprising a polyester reacted with a thermally stabilizing amount of a polycarbonate corresponding to the formula

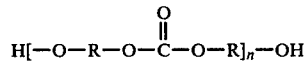

wherein R is a divalent hydrocarbon radical containing 2 to 15 carbon atoms and n is an integer between 2 and 100, in the presence of a catalytic amount of a phosphonium compound selected from the group consisting of tetra-n-alkylphosphonium acetates and tetra-n-alkylphosphonium halides, said n-alkyl radical containing 1 to 6 carbon atoms.

The preparation of the improved polyester can be carried out by condensing an aromatic dicarboxylic acid, preferably terephthalic acid, and/or the lower alkyl ester thereof with a glycol containing 2 to about 10 carbon atoms per molecule under direct esterification and/or ester-interchange conditions. The esterification product is polycondensed, and a stabiziling amount of the above-described stabilizer and catalyst is incorporated in the molten polyester after the polyester has been polycondensed to an intrinsic viscosity of at least 0.4 dl. per gram. Intrinsic viscosity of the polyester is determined by conventional means in 60 percent phenol-40 percent tetrachloroethane mixture.

In continuous production of the improved polyester in accordance with the present invention, the polycarbonate and catalyst are preferably added to the molten polyester process stream with mixing at a point to give 2 to 15 minutes reaction time under superatmospheric pressure before the polyester enters the final polycondensation zone. The amount of said polycarbonate reacted as stabilizer ranges generally from 5 to 70 gram mols of polycarbonate per $10^6$ grams of the polyester. Preferably, 10 to 50 gram mols of polycarbonate is reacted per $10^6$ grams of the polyester. Desirably, about 0.01 to 0.07 gram of the phosphonium compound is added per gram of polycarbonate. The polycarbonates and phosphonium compounds useful in the present invention are known compounds and some are commercially available.

The esterification of the aromatic dicarboxylic acid and/or the lower alkyl esters thereof and the glycol can start at a temperature as low as 200° C. and range up to 300° C. and at atmospheric and superatmospheric pressures ranging up to 500 psig. The reaction, either the direct esterification or ester-interchange is carried out in the absence of oxygen-containing gas. Preferably, the reaction is carried out at a temperature from about 230° C. to about 280° C. and at a pressure ranging from about 50 to 250 psig. The reaction time will vary depending upon the reaction temperature and pressure. The glycol is reacted with the aromatic dicarboxylic acid and/or the lower alkyl ester thereof in an amount ranging from about 1 to about 3 moles of glygol per mol of acid.

The polycondensation of the esterification product obtained by the direct esterification or esterinterchange reaction between the aromatic dicarboxylic acid or lower alkyl ester thereof and the glycol is usually carried out at a reduced pressure which can be as low as 0.1 torr and a temperature in the range of from about 260° C. to about 300° C. This part of the reaction is carried out under these conditions for periods of about 1.0 to about 10 hours and preferably from about 2 to about 6 hours until a polymerized polyester product of the required molecular weight as determined by viscosity or other convenient physical measures is obtained. The duration of such periods depends upon the various process polymerization conditions such as pressure and temperature profiles, ingredient mol ratios, surface generation conditions, catalyst type and concentration, any additives utilized, requisite viscosity, etc. Polycondensation is generally continued until the resultant polyester has an intrinsic viscosity in 60 percent phenol-40 -percent tetrachloroethane mixture of about 0.8 to 1.0 dl. per gram.

DESCRIPTION OF THE PREFERRED EMBODIMENTS

As previously mentioned, the present invention further provides polyester fibers which have excellent resistance to degradation when utilized in reinforced rubber articles, such as tires, industrial belting, etc., wherein a high degree of heat is built up during use.

Accordingly, one preferred embodiment of this invention may be briefly stated as follows:

In a continuous process for the preparation of a high molecular weight linear condensation polyester particularly useful for preparation of tire yarn, wherein terephthalic acid is continuously esterified with a glycol containing 2 to 10 carbon atoms per molecule under esterification conditions and the resulting esterification product is continuously polycondensed in a series of at least two polycondensation zones operating at subatmospheric pressure, the improvement which comprises providing a reduction in the free carboxyl content of the polyester to a carboxyl concentration of less than 12 gram equivalents per $10^6$ grams of polyester by reacting the polyester at about 270° C. to 300° C. with a thermally stabilizing amount of a polycarbonate corresponding to the formula

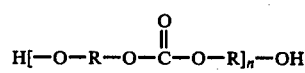

wherein R is a divalent hydrocarbon radical containing 2 to 15 carbon atoms and n is an integer between 4 and 50, in the presence of a catalytic amount of a phosphonium compound selected from the group consisting of tetra-n-alkylphosphonium acetates and tetra-n-alkylphosphonium halides, desirably chlorides or bromides, said n-alkyl radical containing 1 to 6 carbon atoms. The preferred process is further characterized in that the polycarbonate and catalyst are added to the continuous polyester process stream with mixing after the penultimate polycondensation zone at a point to give 2 to 15 minutes reaction with the polyester before the polyester enters the last polycondensation zone, said reaction between the polycarbonate and the polyester being carried out under superatmospheric pressure preferably at 20 to 180 psig.

Preferably, 10 to 50 gram mols of polycarbonate is reacted with $10^6$ grams of the polyester and about 0.01 to 0.06 gram of the phosphonium compound is added per gram of the polycarbonate.

The following examples are illustrative of embodiments of the present invention but are not to be construed as limiting the invention in any way. All parts and percentages are by weight unless otherwise indicated.

EXAMPLE 1

A polyethylene carbonate suitable for use in the process of this invention is prepared as follows.

About 42.8 parts of diphenyl carbonate are mixed with 15.5 parts of ethylene glycol and 0.02 part of zinc acetate dihydrate and the mixture is reacted for about 2 hours at a pot temperature of about 190° C., during which time about 37.6 parts of phenol is distilled off. The residual polyethylene carbonate had a degree of polymerization of about 4.

EXAMPLE 2

About 86.5 parts per hour of terephthalic acid, 54.9 parts per hour of ethylene glycol, 0.33 part per hour of diisopropylamine and 0.05 part per hour of antimony acetate are continuously fed to a paddle mixer where they are converted to a paste. The paste mixture is pumped from the mixer by a feed pump to the inlet of a circulating pump. Then the paste mixture is pumped with 40 parts by weight of a recirculating partially esterified mixture per part of paste mixture by the circulating pump through a multiple tube and shell heat exchanger where the total mixture is heated to 260° C. to 270° C. After leaving the heat exchanger, the mixture enters an esterification reactor which is maintained at 260° C. to 270° C. by conventional heating means, and 90 psig. pressure by means of an automatic vent valve. The recirculating mixture leaving this reactor is split, with part being returned to the inlet of the circulating pump where it is combined with fresh paste and part being fed to a series of three reactors where further esterification takes place at 270° C. to 275° C. Total esterification time is about 3 hours. Following esterification, the reaction mixture is fed into a first polycondensation reactor operating at 275° C. and 30 torr pressure, with a residence time of 60 minutes. The resulting polyester is fed to a second polycondensation reactor operating at 275° C. and 2 torr pressure, with a residence time of 120 minutes. The polyester from the second polycondensation reactor has an intrinsic viscosity of 0.53 dl. per gram and 18 gram equivalents of carboxyl end groups per $10^6$ grams of polyester. It is pumped to a pressurized zone maintained at 60 to 180 psig. and containing a 24 element static mixer. At the entrance of the pressurized zone, molten polyethylene carbonate prepared in Example 1 and containing about 4 percent by weight of added tetra-n-butylphosphonium bromide is continuously injected at the rate of 0.8 part per hour into the polyester flow stream. The polyester is reacted with the polyethylene carbonate in the presence of the phosphonium compound under superatmospheric pressure for 4 to 5 minutes at about 275° C., then the polyester is further polycondensed for 2 hours in a last polycondensation reactor operating at about 275° C. to 278° C. at 0.5 torr pressure. Samples of the polyester entering the last polycondensation reactor show only 2 gram equivalents of carboxyl end groups per $10^6$ grams of polyester. The treatment of the polyester in the last polycondensation reactor strips the carbon dioxide from the polyester and increases the intrinsic viscosity of the polyester to about 0.92 dl. per gram. (The carbon dioxide is a reaction product released when the polyethylene carbonate reacts with the carboxyl end groups of the polyester).

After leaving the last polycondensation reactor the polyester stream is divided, with about 75 parts per hour being pumped through a transfer line at 278° C. to a conventional yarn spinning machine, and 25 parts per hour being extruded into a water bath and pelletized. Yarn is continuously spun and drawn to form 1000 denier, 192 filament yarn. The drawn yarn has an intrinsic viscosity of 0.87 dl. per gram and 6.5 to 7.0 gram equivalents of carboxyl end groups per $10^6$ grams of polyester. The yarn has 14.0 percent ultimate elongation, and 9.0 grams per denier tensile strength. Surprisingly, this yarn retains 90 percent of its strength after exposure to pure ammonia gas for 3 hours at 150° C. This test shows that that the yarn is very stable to both heat and ammonia, which is indicative of a good tire yarn.

Similar results are obtained when the polycarbonate in the reaction mixture is a polyester of carbonic acid and bis(4-hydroxy phenyl)-2,2-propane having a number average molecular weight of about 20,000. To produce a polyester having both high intrinsic viscosity and low free carboxyl content, it is critical that the polycarbonate and phosphonium compound be added to the process stream with adequate mixing at a point to give 2 to 15 minutes reaction time before the polyester enters the last polycondensation reactor. Inadequate mixing or a reaction time less than two minutes gives a polyester product having a relatively high free carboxyl content. A reaction time greater than fifteen minutes tends to decrease the intrinsic viscosity of the product polyester because of degradation of the polyester at the high reaction temperature. In addition, superatmospheric pressure is desirable in the reaction zone to reduce the carboxyl end group concentration to a low value before the polyester enters the last polycondensation reactor where the low pressure causes partial evaporation of the polyethylene carbonate.

EXAMPLE 3 (COMPARATIVE)

The procedure of Example 2 is followed except that the amount of tetra-n-butylphosphonium bromide catalyst in the polyethylene carbonate added to the polyester process stream is varied from zero to 6 weight percent. The effect on the intrinsic viscosity and carboxyl end group content of the polyester yarn is shown in Table 1 below:

TABLE 1

| Weight % Catalyst In Polyethylene Carbonate | Yarn COOH* | Yarn Intrinsic Viscosity |
| --- | --- | --- |
| 0 | 20 | 0.87 |
| 3 | 6.5 | 0.87 |
| 6 | 5.1 | 0.87 |

*gram equivalents of carboxyl end groups per $10^6$ grams of polyester yarn.

EXAMPLE 4 (COMPARATIVE)

Example 2 is repeated except that no polyethylene carbonate or phosphonium catalyst is added to the polyester. The resulting 1000 denier yarn has an intrinsic viscosity of 0.85 dl. per gram and 22 equivalents of carboxyl end groups per $10^6$ grams of polyester. The yarn has 14.7 percent ultimate elongation and tensile strength of 9.2 grams per denier. This yarn retains only 60 to 70 percent of its strength after exposure to pure ammonia gas for three hours at 150° C. These data in comparison with the data of Example 2 demonstrate the beneficial effect of the present invention respecting number of carboxyl end groups and strength retention of the product polyester yarn.

EXAMPLE 5 (COMPARATIVE)

This example demonstrates that the specific phosphonium compound used as catalyst in the present invention is critical respecting the content of carboxyl end groups in the product polyester.

A series of tests are carried out wherein a 50-gram sample of polyethylene terephthalate polyester having an intrinsic viscosity of about 0.9 dl. per gram is melted at 280° C. and reacted for above five minutes under superatmospheric pressure with 0.15 gram of polyethylene carbonate and 0.01 gram of a phosphorus-containing compound to determine the effectiveness of the phosphorus-containing compound as catalyst. The product polyester thus produced is analyzed for intrinsic viscosity (I.V.) and equivalents of carboxyl end groups per $10^6$ grams of polyester (COOH). The results are compared in Table 2 below.

TABLE 2

| Phosphorus Compound Tested | Product Polyester I.V. | COOH |
|---|---|---|
| Tetrabutylphosphonium chloride | 0.86 | 6.6 |
| Triphenylphosphine | 0.86 | 24.7 |
| Ethyltriphenylphosphonium acetate | 0.83 | 30.1 |
| Tetrabutylphosphonium acetate | 0.84 | 6.9 |
| Benzyltriphenylphosphonium chloride | 0.83 | 24.9 |
| No phosphorus compound | 0.83 | 24.6 |
| Control, no additives | 0.87 | 25.5 |

Similar results are obtained when the reaction time is extended to fifteen minutes.

We claim:

1. A high molecular weight linear polyester stabilized against thermal degradation comprising a polyester reacted with a thermally stabilizing amount of a polycarbonate corresponding to the formula

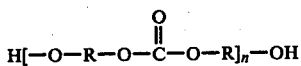

wherein R is a divalent hydrocarbon radical containing 2 to 15 carbon atoms and n is an integer between 2 and 100, in the presence of a catalytic amount of a phosphonium compound selected from the group consisting of tetra-n-alkylphosphonium acetates and tetra-n-alkylphosphonium halides, said n-alkyl radical containing 1 to 6 carbon atoms.

2. The polyester of claim 1 wherein the polyester is polyethylene terephthalate.

3. The polyester of claim 1 wherein the polycarbonate is polyethylene carbonate.

4. In a process for the preparation of a high molecular weight linear condensation polyester wherein terephthalic acid is esterified with a glycol containing 2 to 10 carbon atoms per molecule under esterification conditions and the resulting esterification product is polycondensed, the improvement which comprises providing a reduction in the free carboxyl content of the polyester to a carboxyl concentration of less than 12 gram equivalents per $10^6$ grams of polyester by reacting the polyester in molten form with a thermally stabilizing amount of a stabilizer comprising a polycarbonate corresponding to the formula

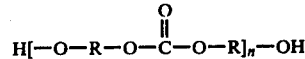

wherein R is a divalent hydrocarbon radical containing 2 to 15 carbon atoms and n is an integer between 2 and 100, in the presence of a catalytic amount of a phosphonium compound selected from the group consisting of tetra-n-alkylphosphonium acetates and tetra-n-alkylphosphonium halides, said n-alkyl radical containing 1 to 6 carbon atoms.

5. The process of claim 4 wherein the glycol is ethylene glycol.

6. The process of claim 4 wherein the polycarbonate is polyethylene carbonate.

7. In a continuous process for the preparation of a high molecular weight linear condensation polyester particularly useful for preparation of tire yarn, wherein terephthalic acid is continuously esterified with a glycol containing 2 to 10 carbon atoms per molecule under esterification conditions and the resulting esterification product is continuously polycondensed in a series of polycondensation zones at subatmospheric pressure, the improvement which comprises providing a reduction in the free carboxyl content of the polyester to a carboxyl concentration of less than 12 gram equivalents per $10^6$ grams of polyester by reacting the polyester in molten form at about 270° C. to 300° C. with a thermally stabilizing amount of polycarbonate corresponding to the formula

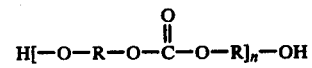

wherein R is a divalent hydrocarbon radical containing 2 to 15 carbon atoms and n is an integer between 4 and 50, in the presence of a catalytic amount of a phosphonium compound selected from the group consisting of tetra-n-alkylphosphonium acetates and tetra-n-alkylphosphonium halides, said n-alkyl radical containing 1 to 6 carbon atoms, said process being further characterized in that the polycarbonate and catalyst are added to the polyester process stream with mixing after the penultimate polycondensation zone and at a point to give 2 to 15 minutes reaction with the polyester before the polyester enters the last polycondensation zone, said reaction between the polycarbonate and the polyester being carried out under superatmospheric pressure.

8. The process of claim 7 wherein the glycol is ethylene glycol.

9. The process of claim 7 wherein the polycarbonate is polyethylene carbonate.

10. The process of claim 7 wherein the tetra-n-alkylphosphonium halide is chloride or bromide.

* * * * *